United States Patent [19]

Kramer

[11] 4,211,542

[45] Jul. 8, 1980

[54] METHOD AND APPARATUS FOR PRODUCING DRY, COMPRESSED AIR FOR ELECTRICAL SWITCH GEAR

[75] Inventor: Wilhelm Kramer, Sandhausen, Fed. Rep. of Germany

[73] Assignee: BBC Brown Boveri & Company Limited, Baden, Switzerland

[21] Appl. No.: 871,339

[22] Filed: Jan. 23, 1978

[30] Foreign Application Priority Data

Jan. 24, 1977 [DE] Fed. Rep. of Germany ....... 2702767

[51] Int. Cl.² .............................................. B01D 53/04
[52] U.S. Cl. ........................................ 55/179; 55/208; 55/387
[58] Field of Search .................... 55/23, 27, 28, 31, 33, 55/62, 74, 75, 179, 208, 387, 389

[56] References Cited

U.S. PATENT DOCUMENTS

| | | | |
|---|---|---|---|
| 1,831,644 | 11/1931 | Adair et al. | 55/23 X |
| 2,037,685 | 4/1936 | Holden | 55/31 X |
| 2,071,868 | 2/1937 | Von Lude | 55/33 |
| 2,535,902 | 12/1950 | Dailey, Jr. | 55/33 |
| 2,699,837 | 1/1955 | Van Note | 55/33 X |
| 3,016,978 | 1/1962 | Hull | 55/208 X |
| 3,148,040 | 9/1964 | Kern, Jr. | 55/33 X |
| 3,324,626 | 6/1967 | Dresser et al. | 55/23 X |
| 3,659,399 | 5/1972 | Kauer, Jr. et al. | 55/33 |
| 3,850,592 | 11/1974 | Huffman | 55/33 |
| 3,883,325 | 5/1975 | Fuhring et al. | 55/74 X |

FOREIGN PATENT DOCUMENTS

478486 1/1938 United Kingdom ......................... 55/74

*Primary Examiner*—Robert H. Spitzer
*Attorney, Agent, or Firm*—Burns, Doane, Swecker & Mathis

[57] ABSTRACT

An apparatus and a method for producing dry, compressed air to be used for electrical switchgear, especially for high-tension switchgear, is disclosed in which humidity is extracted from the air in a subsequently arranged sorption dryer, with one portion of the dried air being used to regenerate a drying agent of the drying apparatus. The drying apparatus includes a cylindrical inner housing which is used for the pre-drying of the air, an outer housing which surrounds the former in jacket form for the final drying and a desorption volume. An electric heating rod protrudes concentrically into the inner housing and is covered by either a baffle device or a pipe so that a ring-gap is created between two components, with the ring-gap divided into two halves. The air is pre-dried in the first drying chamber prior to its entry into the compressor, with the temperature of the air being kept above the dew point during compression and cooling. The air is then heated prior to a second or final drying process with the remaining moisture being removed during the course of this drying process so that the entire humidity of the air is extracted in the steam phase.

9 Claims, 3 Drawing Figures

METHOD AND APPARATUS FOR PRODUCING DRY, COMPRESSED AIR FOR ELECTRICAL SWITCH GEAR

BACKGROUND AND SUMMARY OF THE PRESENT INVENTION

Compressed air is used in electrical switch gear primarily for quenching arcs in gas blast switches and for mechanical actuation of switchgear such as power circuit breakers, disconnecting switches and the like. Such switches require a supply of clean and dry air in order to insure a proper functioning of the switchgear.

A method to produce compressed air is known in which the humidity contained in the atmospheric air is extracted by means of compression and subsequent cooling. A condensation product which accumulates during this process and which emulsifies in part with the lubricating oil is discharged either at the time of shutdown or after a certain period of operation by means of unloader valves which are arranged at the various compressor states. In addition, it is necessary to provide a drainage system for the storage tank which stores the compressed air and is arranged successively to the compressor. The condensation product accumulating in the storage tank must be removed from time to time either manually or by means of a costly automatic system. Such a compressed-air generator which includes both a water separator and drainage systems requires the use of technical equipment that is costly and must be serviced quite frequently due to the formation of sludge caused by resinification of the water/oil emulsion, corrosion of the valves and seals, and the need to remove carbonized components of the lubricating oil from the water separator. Experience has shown that approximately 50% of the breakdowns of compressed-air generators are caused by the drainage system. Finally, a heating device is needed to prevent the freezing of the condensation product.

In another known method for producing and drying compressed air, the compressed air is supercooled at the high-pressure side so that the air will be very dry at the user side. The condensation product accumulating within this system is removed by special water separators which are equipped with electric or pneumatic unloader valves. Operating costs of this method are high when a high compression pressure is obtained.

An object of the present invention is to provide a greatly simplified method to produce and dry compressed air.

Another object of the invention is to provide a drying apparatus for the practical application of the method of the present invention.

In the present invention air is being drawn in and is pre-dried by a first stage of a first drying process prior to its entry into the compressor, with the temperature of the air being kept above the dew point during compression and cooling. The air is then heated prior to a second drying process with the remaining moisture being removed during the course of this second drying process so that the entire humidity of the air is extracted in the steam phase.

The first drying process may be improved still further by subdividing the process into several drying stages. A first drying stage is carried out prior to the compression process with several drying stages being intermixed with the compression process and the final compression stage followed, if necessary, by a last drying stage. These various steps are accomplished in this manner if the compressor has several compression stages.

Any oil that is possibly present in the air in the form of oil droplets, is gasified in the course of the process at the time when the air is being heated prior to the second drying process and is then extracted from the air in the gaseous state.

A drying apparatus, according to the present invention, may comprise a cylindrical inner housing and an outer housing, which surrounds the former in jacket form. The outer housing is used for the pre-drying of the air, and the inner housing is used for the final drying. The inner housing has a cover plate at each of its two ends. One of the cover plates is followed by an additional housing which acts as a desorption volume and is connected with the inner housing by a filter and a one-way valve. A cylindrical hollow body, which accomodates an electric heating rod, protrudes concentrically through the other cover plate into the inner housing. A pipe, that is closed off on one side, is placed over the hollow body so that a ring-gap is created between two components, with the ring-gap divided into two halves. In this way, the compressed air is guided along the heating rod for intensive heating prior to the final drying.

An advantage of the invention is that the process, while still being very efficient, requires a substantially smaller technical outlay than the known methods because the moisture of the air is removed from the compressed air in the vapor state. Another advantage is that there is therefore no need for water separators and unloader devices nor for tanks connected to drainage systems for the removal of condensation products as required by all known methods. For this reason it becomes possible to substantially reduce the dimensions of the compressed air system. The extensive removal of the moisture from the air prior to its entry into the first compression stage of the compressor avoids a saponification, or respectively, a premature aging of the oil. The individual compressor stages can operate at reduced running time with a significantly lower compression. The compressor is no longer subject to corrosion and servicing is reduced to a minimum. In cases where compressed air of a specific relative humidity is required, as is possible for example if the switchgear consists of components made of plastics, humid air may be added to the compressed air in the amount desired. It has been found that this method is less complicated than the removal of humidity from the compressed air until a specific degree of relative humidity has been reached.

DETAIL DESCRIPTION OF THE PREFERRED EMBODIMENTS

Figure 1:
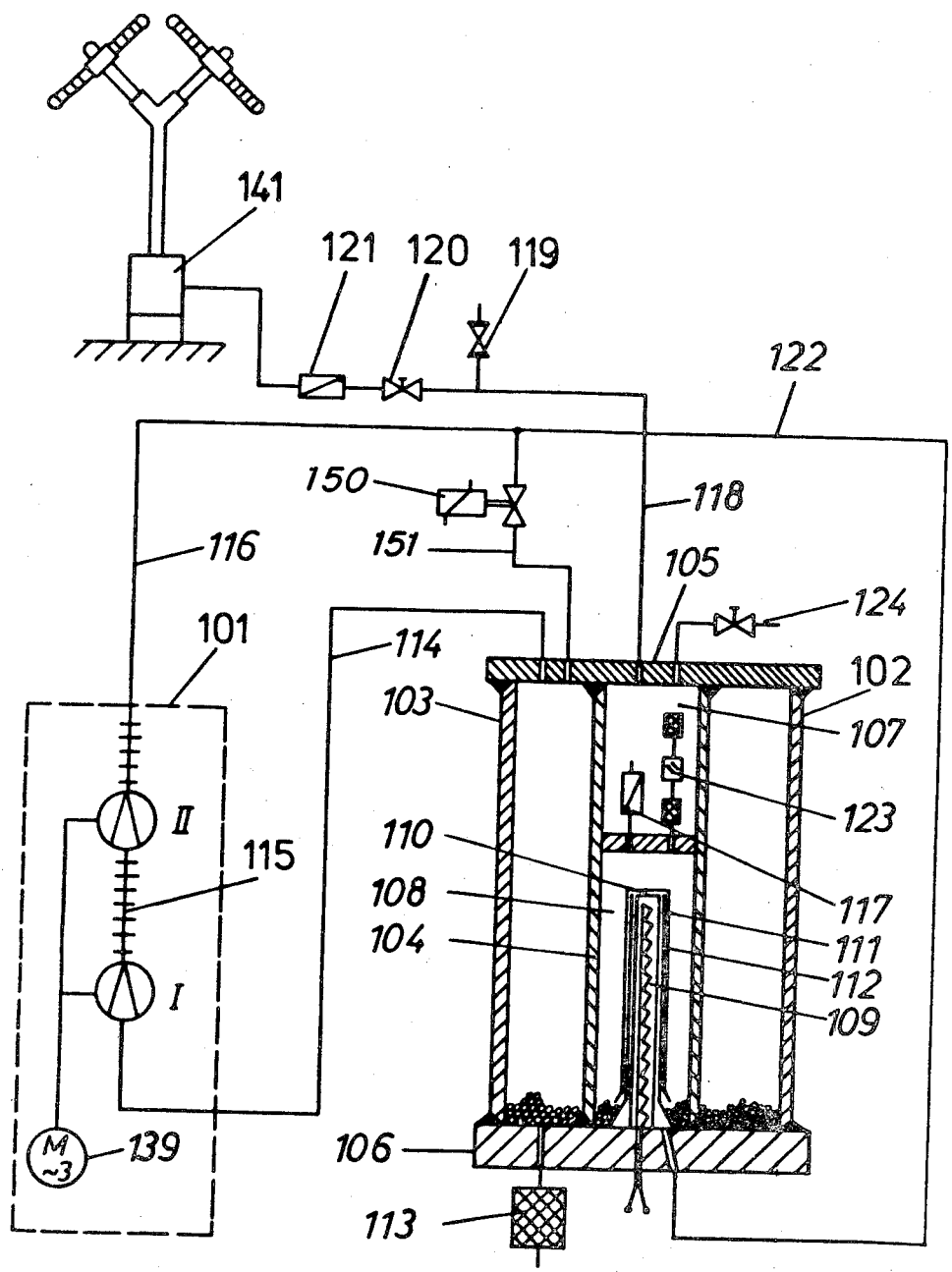
FIG. 1 is a schematic illustration of a plant for the production of compressed air including a cross-sectional view of the drying apparatus of the present invention.

With reference now to FIG. 1, a plant for the production of compressed air includes a compressor 101, which is driven by an electric motor 139. A drying apparatus 102 consists of a cylindrically shaped outer chamber 103 into which is concentrically inserted another hollow cylinder serving as the inner chamber 104. A pair of cover plates 105 and 106 are welded to the ends of both chambers. The inner chamber is divided by a partition into a desorption volume 107 and a heating chamber 108 into which projects an electric heating rod 109. The heating rod passes through the base cover plate 106 and is surrounded by a baffle device 110 which serves to guide the flow of compressor air directly along the heating rod. The baffle device consists of a first pipe 111 which is placed over the heating rod 110 and is fastened at a conically widened end to the base plate 106. A second pipe 112 which is closed off at one end surrounds the first pipe 111. Two ends of the pipe 112 remain at a distance relative to pipe 111, thus allowing the compressor air to flow back and forth along the heating rod 109. The outer chamber 103 and the inner chamber 104 are filled with silica gel.

In the plant, atmospheric air is drawn in by way of a two-stage compressor 101 with the air entering the outer chamber 103 through an air filter 113. In a first drying process the major portion of the moisture is removed from the air in this chamber by the silica gel. The air then passes through a conduit 114 and reaches the first compression stage of the compressor. The air is precompressed and is cooled off in condenser 115. From here the air is fed into a second compression stage for final compression. The air is maintained, however, at a temperature above the dew point during compression and cooling. Next the compressed air is piped through conduits 116, 122 into the inner chamber 104 for final drying, entering first the baffle device 110 of the electric heating rod 109. The air is then guided back and forth along the heating rod by the baffle device and is heated up intensively. The heating causes the remaining moisture to be vaporized and any oil droplets which might be present in the compressed air to be gasified. The moisture and gasified oil droplets are extracted from the compressed air during its subsequent passage through the silica gel filling of the inner housing. The compressed air now flows through a one-way valve 117 into the desorption volume 107. From there the air is conducted directly to a high-tension switch 141 by way of a conduit 118 which is provided with a safety valve 119, a shutoff valve 120 and a flowback valve 121. A pressure relief valve 124 is provided for the venting of the desorption volume.

The drying apparatus is regenerated, that is, the air moisture collected within the silica gel filling is removed, by having a quantity of dry air, which is retained in the desorption volume 107, moved during the shutdown of the compressor in opposite direction through the drying apparatus.

In the regeneration process, e.g., at the beginning of the shutdown, the drive control of the compressor will actuate an electromagnetic valve 150 which will open up a conduit 151, 122 that connects the heating chamber 108 with the outer chamber 103. A slow return flow of dry air from the desorption volume 107, adjusted by a filter 123 will now take place. The air passes through both the heating chamber 108 and the baffle device 110, and by way of the conduit 122, 151 travels to the outer chamber 103. From there the air passes through the air filter 113 to the atmosphere where the moisture absorbed by the dry air is released. The drying apparatus is now again ready for operation.

Figure 2:
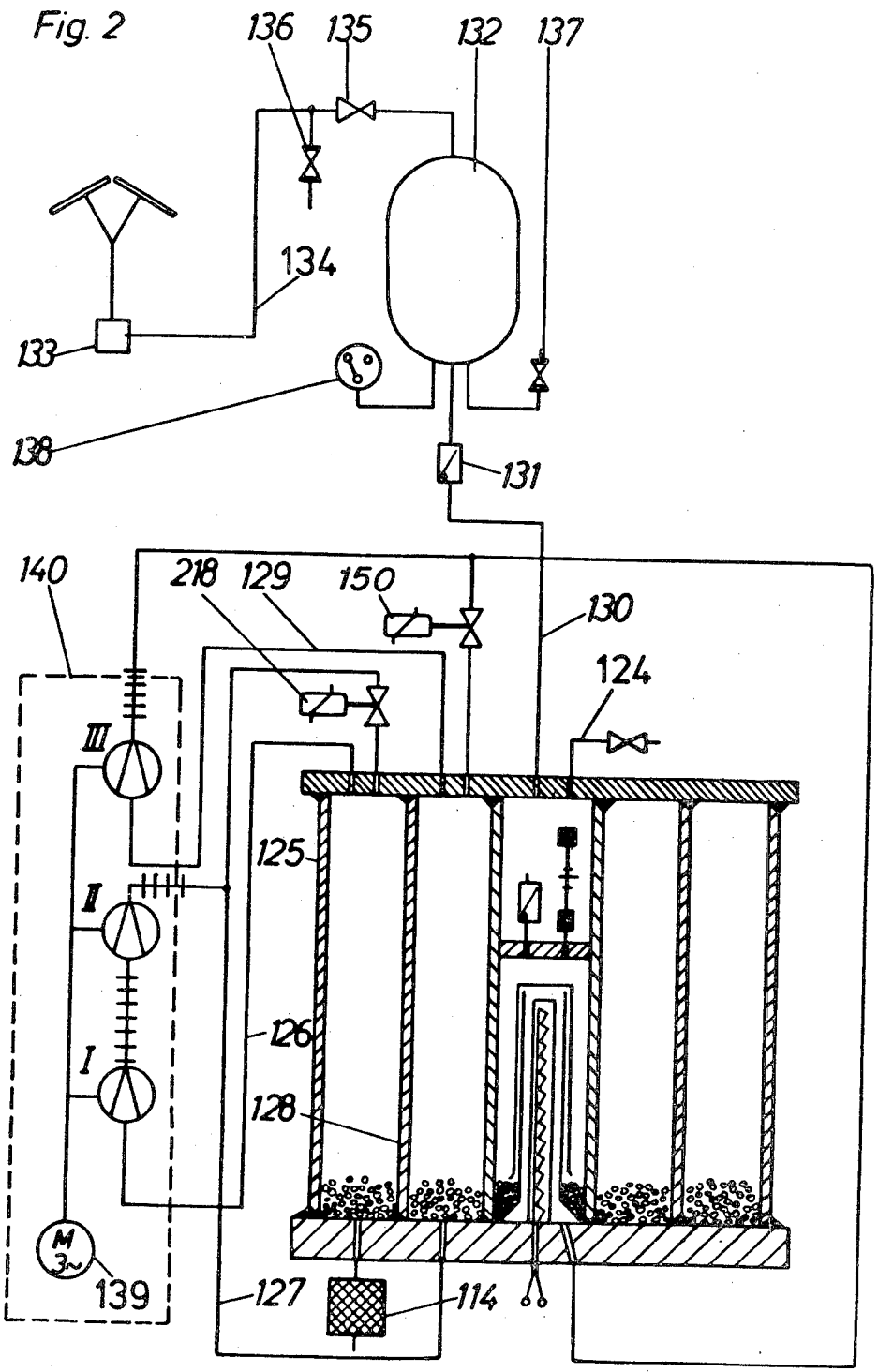
FIG. 2 is a schematic illustration of a plant for the production of compressed air including a cross-sectional view of a drying apparatus containing a two-stage pre-drying arrangement.

In the drying apparatus as shown in FIG. 2, the first drying process has a first and a second drying stage whereby the outer chamber 103 (see FIG. 1) is provided with an additional, first-line drying chamber 125 having a silica gel filling. An air filter 114 is connected to this chamber with air being introduced into the chamber 125 through the air filter. A compressor 140 has three compression stages with one of the drying stages occurring between the second and third compression stages. The atmospheric air is first drawn in through the drying chamber 125 where it is pre-dried and transported by way of conduit 126 to the first two compression stages. The compressed air is then moved from the second compression stage through a conduit 127 to the chamber 128 for further drying. From there the air is conducted through the conduit 129 to the third compression stage. The final drying process takes place in the same manner as described above in connection with the embodiment of FIG. 1. The arrangement differs from that of FIG. 1 however, in that the compressed air, after drying, is not fed directly into the high-tension switch but instead passes by way of a conduit 130, containing a one-way valve 131, into a storage tank 132. From here the compresssed air switch 133 is supplied with air by way of conduit 134 containing a reduction valve 135 and a safety valve 136. The storage tank 132 is equipped with a safety valve 137 and a pressure switch 138 which will actuate the compressor if the pressure drops below nominal pressure.

For a regeneration of the drying apparatus of FIG. 2, a magnetic valve 218 is actuated together with a magnetic valve 150 in a manner similar to the regeneration of the drying apparatus of FIG. 1.

Figure 3:
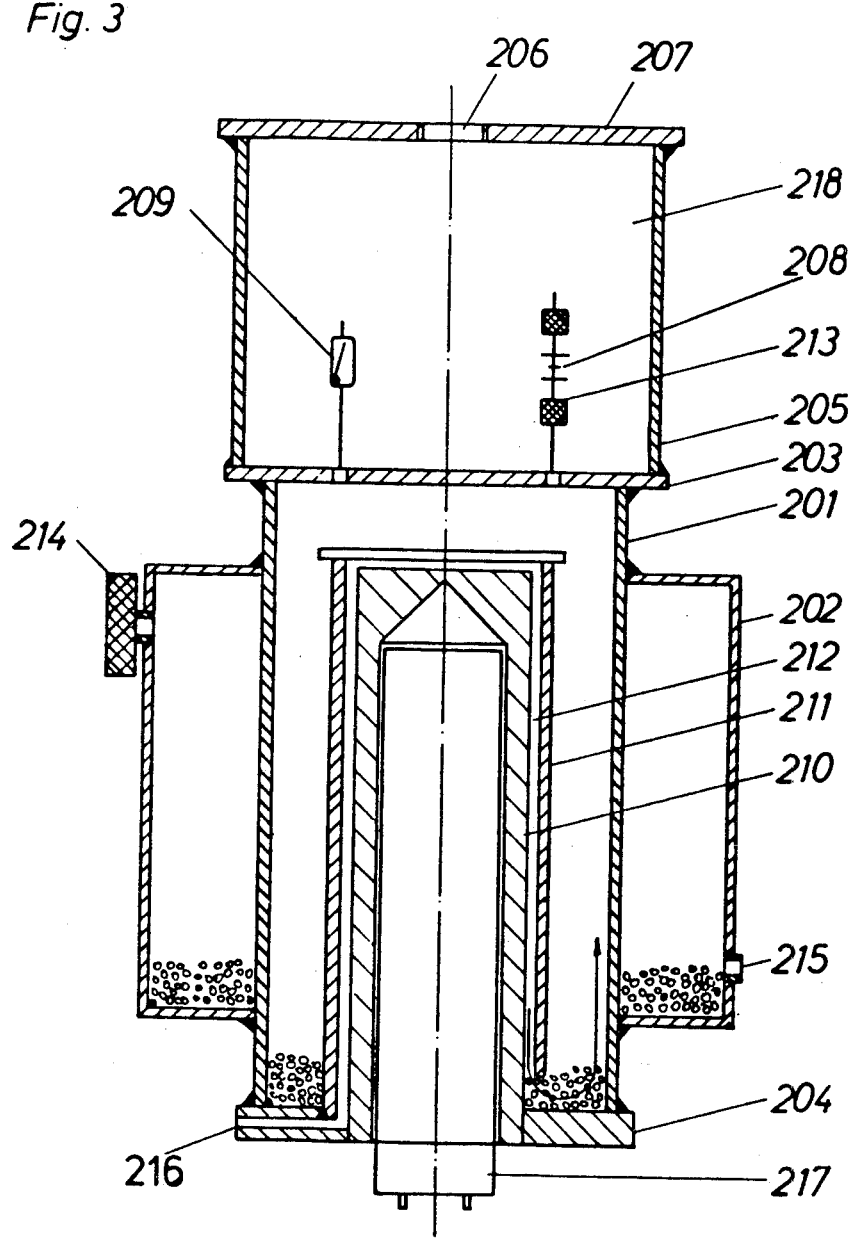
FIG. 3 is a cross-sectional view of another embodiment of a drying apparatus according to the present invention.

With reference now to FIG. 3, still another embodiment of a drying apparatus is illustrated in longitudinal crosssection. This drying apparatus has a cylindrical inner housing 201, which is surrounded by an outer housing 202 in jacket form. The inner housing carries cover plates 203, 204 at its two ends. At the cover plate 203 there is placed an additional cylindrical housing 205 which serves as a desorption volume and which is provided at its frontal area 207 with an aperture 206 for the passage of the compressed air into a storage tank. The inner housing 201 is connected with the desorption volume by way of a filter 208 and a one-way valve 209. At both sides of the filter there is placed a sintered cartridge 213 to act as filters. A cylindrical hollow body 210 projects concentrically through the cover plate 204 into the inner housing 201, to accomodate a heating rod 217. A tube 211, which is closed off on one side, is placed over the heating unit 210 so that a ring-gap 212 is created between the two components. The ring-gap is divided in axial direction into two halves so that the compressed air is being guided along the heating rod for intensive heating prior to the final drying. The drying process takes place with atmospheric air being conducted through an intake filter 214 for pre-drying through the outer housing which is filled with silica gel. The air will then enter the compressor by way of intake 215. After being compressed, the air enters the inner housing 201 through a duct 216 in the cover plate 204. The air passes first through the ring-gap 212, and is guided there along the heating rod 217 for intensive heating. In this way, the compressed air flows upwardly within one half of the divided ring-gap and downwardly within the other half, flowing from there through the inner housing which is filled with silica gel. The remaining moisture is extracted in this way from the air which then continues its flow to the switchgear in the same manner as described above.

What is claimed is:

1. A drying apparatus for removing moisture from air for use in electric switchgear comprising:
   a compressor having an inlet for pre-dried air and an outlet for compressed air;
   a housing including:
   an outer annular cylindrical housing portion in fluid communication with the inlet of the compressor;
   means disposed within said outer annular cylindrical housing portion to pre-dry at least atomspheric air;
   an inner cylindrical housing portion in fluid communication with the outlet of the compressor;
   heating means for heating the compressed air within said inner cylindrical housing portion to a temperature sufficient to render moisture within the air to a steam phase; and
   means within said inner cylindrical housing portion to dry said heated compressed air.

2. The drying apparatus of claim 1 wherein the outer annular housing portion and the inner cylindrical housing portion contain silica gel.

3. The drying apparatus of claim 1 wherein the housing further includes
   a desorption housing portion in fluid communication with the inner cylindrical housing.

4. The drying apparatus of claim 1 wherein the heating means comprises an electric heating rod which protrudes concentrically into the inner cylindrical housing portion.

5. The drying apparatus of claim 1 further comprising means for directing the compressed air over said heating means.

6. The drying apparatus of claim 5 wherein the means for circulating the compressed air over said heating means comprises a baffle device.

7. The drying apparatus of claim 5 wherein the means for circulating the compressed air over said heating means comprises a pipe which fits loosely over the heating means to form a ring-gap between the pipe and the heating means.

8. The drying apparatus of claim 7 wherein the ring-gap is divided into two halves with the compressed air being guided successively through the two halves.

9. The drying apparatus of claim 1 wherein the housing further includes
   an intermediate cylindrical housing portion between the outer annular cylindrical housing portion and the inner cylindrical housing portion, in fluid communication with an outlet of a stage of the compressor and with an inlet of a stage of the compressor.

* * * * *